(12) United States Patent
Hong et al.

(10) Patent No.: US 8,656,208 B2
(45) Date of Patent: Feb. 18, 2014

(54) COMMUNICATION SYSTEM WITH AUTOMATIC RESTORING FUNCTION AGAINST FAULTY OPERATION AND RESTORING METHOD THEREOF

(75) Inventors: Jae-Surk Hong, Yongin-si (KR); Chul-Yong Joung, Yongin-si (KR)

(73) Assignee: ATLab Inc. (KR)

( * ) Notice: Subject to any disclaimer, the term of this patent is extended or adjusted under 35 U.S.C. 154(b) by 644 days.

(21) Appl. No.: 12/937,617

(22) PCT Filed: Mar. 5, 2009

(86) PCT No.: PCT/KR2009/001108
§ 371 (c)(1),
(2), (4) Date: Oct. 13, 2010

(87) PCT Pub. No.: WO2009/131307
PCT Pub. Date: Oct. 29, 2009

(65) Prior Publication Data
US 2011/0035632 A1  Feb. 10, 2011

(30) Foreign Application Priority Data

Apr. 23, 2008 (KR) .................. 10-2008-0037817

(51) Int. Cl.
*G06F 11/00* (2006.01)
(52) U.S. Cl.
USPC .................. 714/4.1; 714/25; 714/10; 714/48
(58) Field of Classification Search
USPC ..................... 714/4.1, 4.11, 48; 709/208, 209
See application file for complete search history.

(56) References Cited

U.S. PATENT DOCUMENTS 5,572,662 A   11/1996 Ohta et al.
5,841,983 A   11/1998 Takaba et al.
(Continued)

FOREIGN PATENT DOCUMENTS

CN   101051881   10/2007
CN   101136000    3/2008
(Continued)

OTHER PUBLICATIONS

Taiwanese Office Action—Taiwanese Application No. 098108612 issued on Oct. 17, 2012, citing US20070229468.

(Continued)

*Primary Examiner* — Sarai Butler
(74) *Attorney, Agent, or Firm* — Cantor Colburn LLP (57) ABSTRACT

Provided are a communication system and a method of restoring the communication system. The communication system includes a master device for transmitting a reference clock through a clock line, transmitting and receiving data through a data line, and requesting and receiving input data and error detection data, and a slave device for detecting human touch input data, transmitting and receiving the data in synchronization with the reference clock or generating and transmitting the input data, and transmitting the error detection data in response to the request for error detection data. Here, the master device compares stored error detection data with the received error detection data and initializes the slave device when the stored error detection data is not the same as the received error detection data. Therefore, in the master-slave communication system capable of automatic restoration from a malfunction and the method of restoring the communication system, a master device recognizes malfunction of a slave device having a volatile storage due to its surroundings, initializes the slave device, and thus can restore the slave device to its normal operating state.

34 Claims, 8 Drawing Sheets

(56) References Cited

U.S. PATENT DOCUMENTS

| | | | |
|---|---|---|---|
| 7,313,178 B2 * | 12/2007 | Iadanza | 375/224 |
| 7,451,270 B1 * | 11/2008 | Criswell | 711/112 |
| 2006/0024055 A1 | 2/2006 | Kawase et al. | |
| 2007/0006025 A1 * | 1/2007 | Onozuka et al. | 714/11 |
| 2007/0073824 A1 | 3/2007 | Choo et al. | |
| 2007/0088775 A1 * | 4/2007 | Asplund et al. | 709/201 |
| 2007/0229468 A1 | 10/2007 | Peng et al. | |
| 2007/0287494 A1 * | 12/2007 | You et al. | 455/550.1 |
| 2008/0059679 A1 | 3/2008 | Zhang et al. | |
| 2008/0158177 A1 * | 7/2008 | Wilson et al. | 345/173 |

FOREIGN PATENT DOCUMENTS

| | | |
|---|---|---|
| JP | 08030519 | 2/1996 |
| JP | 863365 | 3/1996 |
| JP | 8285735 | 11/1996 |
| JP | 2004206472 | 7/2004 |
| JP | 200650092 | 2/2006 |
| JP | 2006209227 | 8/2006 |
| JP | 200774715 | 3/2007 |
| KR | 1019990061869 | 7/1999 |
| KR | 1020000041926 | 7/2000 |
| KR | 1020020033249 | 5/2002 |
| KR | 1020070027363 | 3/2007 |

OTHER PUBLICATIONS

Japanese Office Action—Japanese Application No. 2011-506179 issued on Sep. 25, 2012, citing JP2007-074715, JP2006-209227, JP2006-050092, JP2004-206472, JP08-285735, JP08-063365 and JP08-030519.

Written Opinion—PCT/KR2009/001108 dated Oct. 23, 2009.

Korean Office Action—Korean Application No. 10-2008-0037817 dated May 12, 2010; citing KR 1999-61869 and KR 10-2002-0033249.

International Search Report—PCT/KR2009/001108 dated Oct. 23, 2009.

* cited by examiner

COMMUNICATION SYSTEM WITH AUTOMATIC RESTORING FUNCTION AGAINST FAULTY OPERATION AND RESTORING METHOD THEREOF

BACKGROUND OF THE INVENTION

1. Field of the Invention

The present invention relates to a communication system and a method of restoring the same, and more particularly, to a communication system capable of recognizing a malfunction of a slave device having a volatile storage and automatically restoring the slave device to its normal operating state, and a method of restoring the communication system.

2. Description of the Related Art

In general, when a fault occurs in a master-slave communication system due to surroundings, for example, when a slave device having a non-volatile storage such as a flash read-only memory (ROM) or a ROM malfunctions due to external static electricity and other noise, the malfunction is recognized by comparing normal data stored in the non-volatile memory with data changed by the system fault. Then, the malfunctioning device is reset and restored to its normal state. Consequently, the data of the non-volatile storage that is not changed or lost is read to restore the slave device to its normal operating state.

However, when a slave device using a volatile storage, such as direct random access memory (DRAM) and static random access memory (SRAM), is affected by external static electricity and other noise, data is generally changed or lost regardless of a user's intentions, and the device malfunctions or stops operating.

When a power supply voltage is not applied, devices using a volatile storage lose stored data. Thus, when a power supply voltage is reduced to the ground voltage and then restored, stored data is changed or lost and the devices cannot be restored to their normal operating state by reading the normal data, unlike devices using a non-volatile storage.

Therefore, to be restored to their normal operating state, devices using a volatile storage must receive a set value from outside and be reinitiated.

Likewise, when a master device having a non-volatile storage and a slave device having a volatile storage are affected by external static electricity and other noise in a master-slave communication system, only the slave device malfunctions due to its changed data. Here, even if the slave device malfunctions and transmits the corrupted data, the master device cannot recognize that the received data is corrupted. Thus, believing that the malfunctioning slave device is normally operating, the master device receives the corrupted data of the slave device and operates, and the entire system may malfunction due to the corrupted data.

Figure 1:
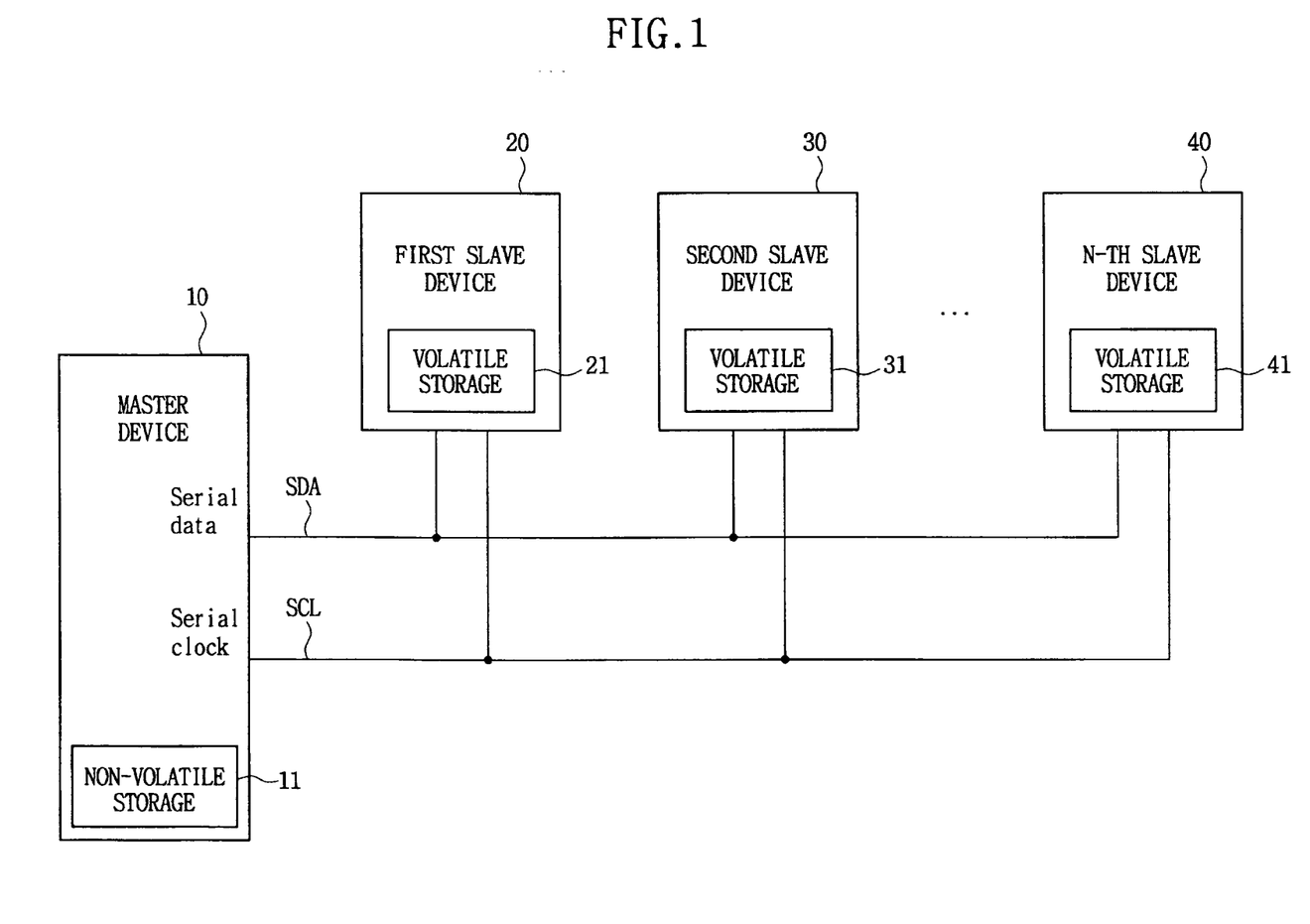
FIG. 1 is a block diagram of a conventional serial communication system.

FIG. 1 is a block diagram of a conventional serial communication system including a master device 10, a first slave device 20, a second slave device 30 and an N-th slave device 40. The master device 10 includes a non-volatile storage 11, and the slave devices 20, 30 and 40 include volatile storages 21, 31 and 41, respectively.

In the serial communication system of FIG. 1, the master device 10 and the slave devices 20, 30 and 40 are connected through a data line SDA and a clock line SCL and communicate with each other.

When the second slave device 30 is affected by external static electricity and other noise and data of the volatile storage 31 is corrupted, the master device 10 receives the corrupted data of the volatile storage 31 of the second slave device 30. However, the master device 10 cannot recognize that the received data is corrupted and operates, causing the system to malfunction.

As described above, the master device 10 of the conventional communication system cannot recognize whether the received data is corrupted due to a malfunction of the second slave device 30, and the second slave device 30 cannot recognize its malfunction either. Consequently, the entire system operates as though the malfunction were a normal operation.

When the master device 10 having the non-volatile storage 11 malfunctions due to external static electricity and other noise, it recognizes its malfunction using an internal program, resets the master device 10 itself and the slave devices 20, 30 and 40, reads data of the non-volatile storage 11, and restores itself and the slave devices 20, 30 and 40 to their normal operating state. On the other hand, when only the slave devices 20, 30 and 40 and not the master device 10 are affected by external static electricity and other noise, the master device 10 operates normally but cannot recognize data errors of the slave devices 20, 30 and 40 connected through the communication lines SDA and SCL.

As described above, when the slave devices 20, 30 and 40 are affected by external static electricity and other noise, data of the volatile storages 21, 31 and 41 is changed or lost, and thus the slave devices 20, 30 and 40 cannot restore themselves from their malfunction state to their normal operating state. In addition, the slave devices 20, 30 and 40 cannot recognize their malfunctions due to changed or lost data and thus cannot report their malfunction states to the master device 10. In particular, when the slave devices 20, 30 and 40 function as touch sensors, static electricity is applied by touching and corrupts data stored in the volatile storages 21, 31 and 41. For example, when a human body contacts the touch sensors, static electricity in the human body is easily coupled to the touch sensors. Since the static electricity is large enough, power supply voltages of the touch sensors may be changed and thus data stored in any volatile memory such as registers and memories may be changed due to the changed power supply voltages of the touch sensors.

Consequently, conventional communication systems including a slave device having a volatile storage require a method of recognizing malfunction of a slave device due to corruption of data of a volatile storage by external static electricity and other noise, and restoring the slave device to its normal operating state.

SUMMARY OF THE INVENTION

The present invention is directed to providing a master-slave communication system capable of recognizing malfunction of a slave device due to internal data changed by surroundings, and restoring the slave device to its normal operating state.

The present invention is also directed to providing a method of restoring the master-slave communication system.

One aspect of the present invention provides a communication system comprising: a master device for transmitting a reference clock through a clock line, transmitting and receiving data through a data line, and requesting and receiving input data and error detection data; and a slave device for detecting human input data, transmitting and receiving the data in synchronization with the reference clock or generating and transmitting the input data, and transmitting the error detection data in response to the request for error detection data. Here, the master device compares stored error detection data with the received error detection data and initializes the slave device when the stored error detection data is not the same as the received error detection data.

The human input data is generated by a touch of a human body and the error is caused by a static electricity of the human body.

During initialization, the master device may transmit the stored error detection data, and the slave device may receive and store the error detection data. After initialization, the master device may receive the error detection data stored in the slave device, compare the received error detection data with the stored error detection data or error detection data received from the slave device during initialization, and initialize the slave device when the received error detection data is not the same as the stored error detection data or the error detection data received from the slave device during initialization.

The slave device may include: an input unit for receiving an external signal applied from outside and generating and outputting the input data; a register for storing the received error detection data and the output input data; and a communication controller for transmitting and receiving the data and the error detection data, transmitting the input data, and transmitting the error detection data stored in the register in response to the request of the master device.

The input unit is a touch sensor recognizing whether or not an external object such as a human body touches the slave device or a proximity sensor recognizing whether or not the external object is in a proximity of the slave device, and the external signal is generated by a touch or a proximity of the human body.

The slave device may further include a data generator for generating the error detection data using a previously set algorithm, and during initialization, may generate the error detection data and store the error detection data in the register at an initialization and/or a regular interval or upon a request from the master device, and may transmit the error detection data through the communication controller.

Another aspect of the present invention provides a communication system comprising: a master device for transmitting a reference clock through a clock line, transmitting and receiving data through a data line, and receiving input data through the data line; and a slave device for detecting human input data, transmitting and receiving the data in synchronization with the reference clock, generating and transmitting the input data and a detection signal for reporting an operating state error, and having set error verification data. When the slave device detects an error using the error verification data, it generates and transmits the detection signal to the master device, and the master device initializes the slave device in response to the detection signal. When the slave device detects an error using the error verification data, it generates and transmits the detection signal to the master device, and then initializes by itself.

During initialization, the master device may transmit error detection data set the same as the error verification data, and the slave device may receive and store the error detection data. After initialization, the slave device may compare the error verification data with the error detection data stored in the slave device and generate and transmit the detection signal to the master device when the error verification data is not the same as the stored error detection data, and the master device may initialize the slave device in response to the detection signal.

The communication system may further include: an error signal line for the slave device to rapidly transmit the detection signal indicating a malfunction state to the master device.

The slave device may include: an input unit for receiving an external signal applied from outside and generating and outputting the input data; a register for storing the received error detection data and the input data outputted from the input unit; a register monitor having the set error verification data, comparing the error verification data with the stored error detection data, and generating and outputting the detection signal when the error verification data is not the same as the stored error detection data; and a communication controller for transmitting and receiving the data, transmitting the input data, and receiving and transmitting the detection signal.

The slave device may further include a data generator for generating the same error detection data as the error verification data using a previously set algorithm, and may generate and store the error detection data in the register during initialization or at a given time period or upon a request from the master device.

After initialization or at a given time period or upon a request from the master device, the slave device may set and store an error state bit indicating an error state when it compares the error verification data with the stored error detection data and determines that the error verification data is not the same as the stored error detection data, and the master device may request and receive the input data including the error state bit when it detects the detection signal, and initialize the slave device when the error state bit is set in the received input data.

Still another aspect of the present invention provides a method of restoring a communication system including a master device for transmitting a reference clock and data and requesting and receiving input data and error detection data, and a slave device for receiving the data in synchronization with the reference clock and generating and transmitting the input data, the method comprising: a data setting step of initializing the master device and the slave device, and storing, at the slave device, the error detection data for detecting a malfunction; an error detection step of requesting and receiving, at the master device, the error detection data and determining whether or not the error detection data is changed; and an initialization step of initializing, at the master device, the slave device according to whether or not the error detection data is changed.

Yet another aspect of the present invention provides a method of restoring a communication system including a master device for transmitting a reference clock and data and requesting and receiving input data, and a slave device for receiving the data in synchronization with the reference clock, generating and transmitting the input data, and having set error verification data, the method comprising: a data setting step of initializing the master device and the slave device and storing error detection data for detecting a malfunction of the slave device; an error detection step of comparing, at the slave device, the error verification data with the stored error detection data and outputting a detection signal according to whether or not the error verification data is the same as the error detection data; and an initialization step of initializing, at the master device, the slave device in response to the detection signal.

DETAILED DESCRIPTION OF THE INVENTION

Hereinafter, exemplary embodiments of the present invention will be described in detail. However, the present invention is not limited to the exemplary embodiments disclosed below, but can be implemented in various forms. The following exemplary embodiments are described in order to enable those of ordinary skill in the art to embody and practice the invention.

Figure 2:
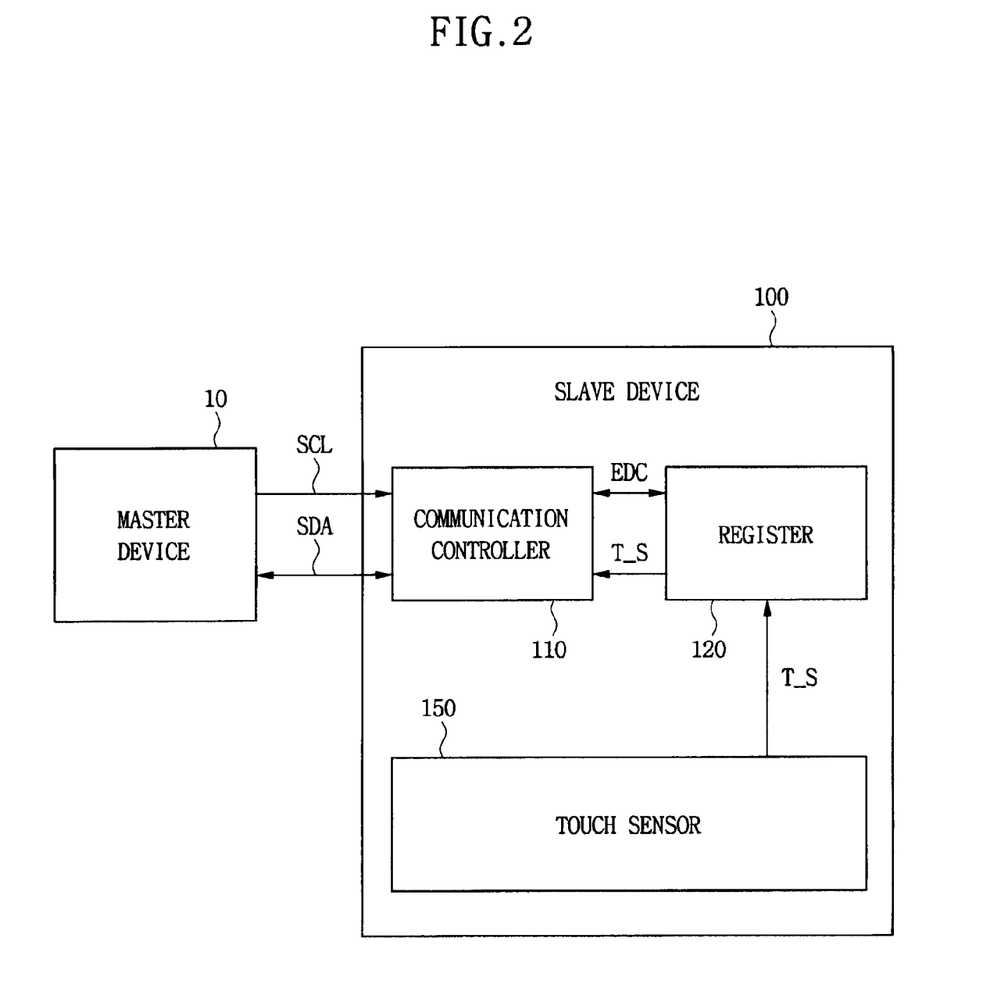
FIG. 2 is a block diagram of a communication system capable of automatic restoration according to a first exemplary embodiment of the present invention.

FIG. 2 is a block diagram of a communication system capable of automatic restoration according to a first exemplary embodiment of the present invention. The communication system includes a master device 10 and a slave device 100, and the slave device includes a communication controller 110, a register 120, and a touch sensor 150.

The components of the communication system capable of automatic restoration shown in FIG. 2 will be described below.

Here, the master device 10 includes a non-volatile storage (not shown), and the slave device 100 includes a volatile storage, that is, the register 120.

The master device 10 and the slave device 100 are connected through a data line SDA and a clock line SCL. The master device 10 outputs a reference clock through the clock line SCL to synchronize with a data transfer rate, transmits and receives various commands and data to and from the slave device 100 through the data line SDA in synchronization with the reference clock, checks for malfunction of the slave device 100 using the transmitted and received data, and outputs a command and data for initializing the slave device 100 when the slave device 100 malfunctions. In particular, the master device 10 outputs error detection data EDC for determining whether or not the slave device 100 malfunctions.

The communication controller 110 of the slave device 100 receives the reference clock from the master device 10, receives commands and data from the master device 10 in synchronization with the reference clock, and transmits data generated by the slave device 100. In particular, the communication controller 110 transmits touch data T_S stored in the register 120 or a register value, i.e., the error detection data EDC, for monitoring the operating state of the slave device 100 to the master device 10.

When an external object (not shown) such as a human body, for example, a human finger touches the slave device 100, the touch sensor 150 generates and outputs the touch data T_S to the register 120. That is, the slave device 100 detects a human input data by a touch of a human body.

For convenience, a touch sensor recognizing whether or not an external object such as a human body touches the slave device is employed here as an example. However, any input devices, e.g., a proximity sensor recognizing whether or not the external object is in a proximity of the slave device and an ultrasonic sensor, or any devices having a unique function, e.g., lighting control and motor speed control, can be employed.

The register 120 includes a plurality of volatile data storages such as flip-flops and latches (not shown), stores the touch data T_S output from the touch sensor 150, receives the error detection data EDC from the master device 10 and stores it. In addition, the register 120 outputs the stored touch data T_S and the stored error detection data EDC to the communication controller 110, and is initialized when the slave device 100 is initialized. A typical example of the error is caused by static electricity of a human body. When a human body approaches the touch sensor 150, the static electricity may create an electric shock and make a power supply voltage (not shown) of the slave device negative. So, contents of the register 120 may be changed. Conversely, protection circuits in the master device 10 that are not directly affected prevent the electric shock.

Figure 3:
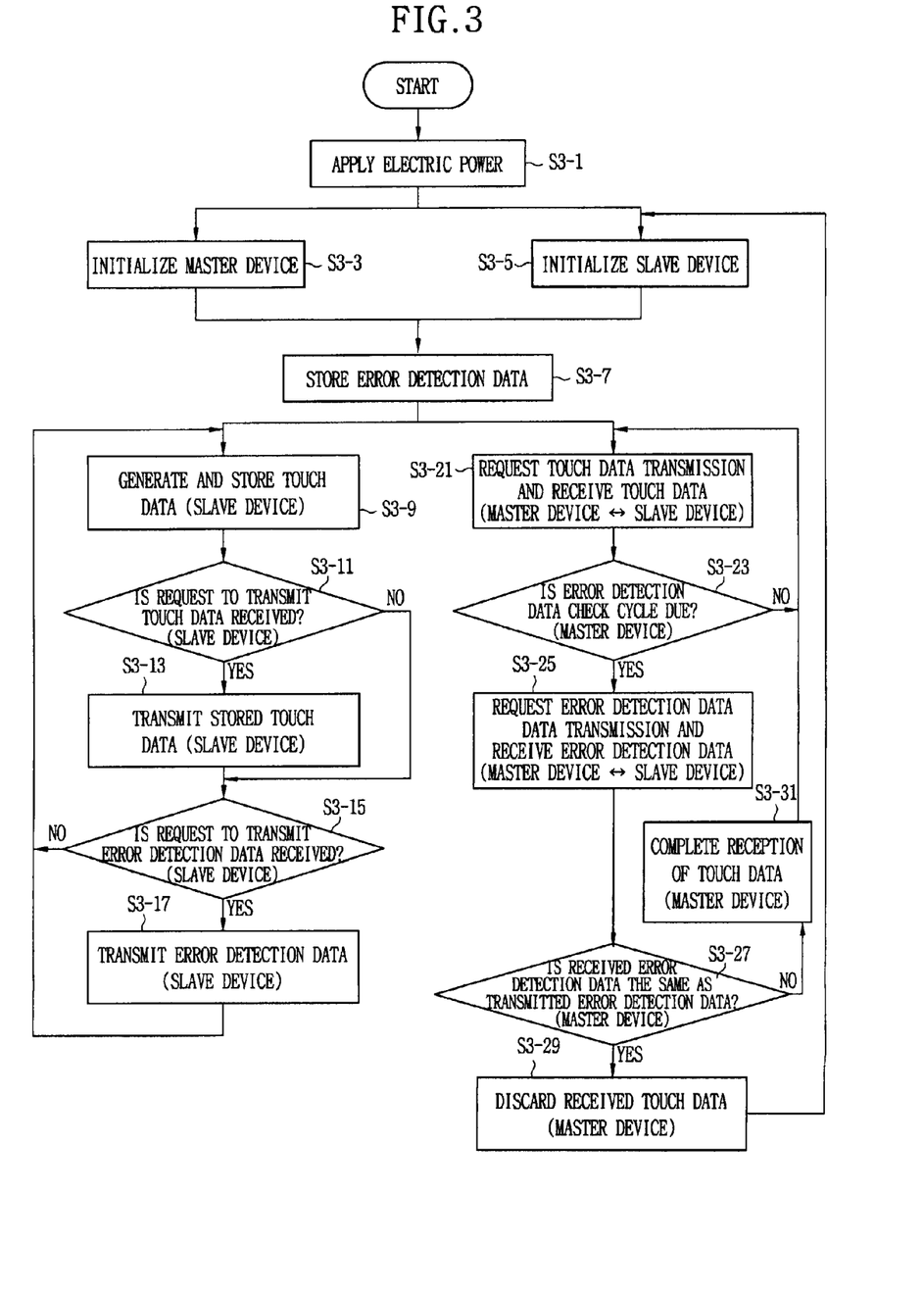
FIG. 3 is a flowchart showing a restoration operation of the communication system capable of automatic restoration shown in FIG. 2.

FIG. 3 is a flowchart showing a restoration operation of the communication system capable of automatic restoration shown in FIG. 2.

The restoration operation of the communication system capable of automatic restoration illustrated in FIG. 3 will be described below with reference to FIG. 2.

Electric power is applied to the master device 10 and the slave device 100 (S3-1).

When electric power is initially applied, the master device 10 performs an initialization step of initializing a register (not shown), etc. (S3-3), and simultaneously, the slave device 100 also performs the initialization step (S3-5). In particular, the register 120 of the slave device 100 is also initialized while the slave device 100 is initialized.

Subsequently, the master device 10 outputs the error detection data EDC, and the slave device 100 receiving the error detection data EDC stores it in the register 120 (S3-7).

The touch sensor 150 of the slave device 100 determines whether or not an external object touches the slave device 100 to generate the touch data T_S and outputs the generated touch data T_S to the register 120, and the register 120 stores the touch data T_S input from the touch sensor 150 (S3-9).

The communication controller 110 of the slave device 100 checks whether a request to transmit the touch data T_S is received from the master device 10 (S3-11), transmits the touch data T_S stored in the register 120 when the request is received (S3-13), and then performs the next step S3-15.

On the other hand, when the request is not received, the communication controller 110 checks whether a request to transmit the error detection data EDC is received from the master device 10 (S3-15), and transmits the error detection data EDC stored in the register 120 when the request is received (S3-17).

When it is checked in step S3-15 that the request is not received, step S3-9 is performed.

Subsequently, the slave device 100 repeats steps S3-9 to S3-17 described above.

Needless to say, the slave device 100 receives data transmitted from the master device 10 and processes it while repeating the process of outputting the touch data T_S and the error detection data EDC.

Meanwhile, the master device 10 requests the slave device 100 to transmit the touch data T_S, and receives the touch data T_S of the slave device 100 (S3-21).

Then, the master device 10 periodically checks whether a check cycle set to check the error detection data EDC stored in the slave device 100 is due (S3-23), and performs step S3-21 to receive the touch data T_S of the slave device 100 when the set check cycle is not due.

On the contrary, when it is checked in step S3-23 that the set check cycle is due, the master device 10 requests the register 120 to transmit the stored error detection data EDC and receives the error detection data EDC of the slave device 100 (S3-25).

Subsequently, the master device 10 checks whether the received error detection data EDC is the same as the error detection data EDC that has been previously transmitted to the slave device 100 by comparing them with each other (S3-27).

When it is checked in step S3-27 that the two pieces of error detection data EDC are the same, the master device 10 completes reception of the touch data T_S (S3-31) and performs step S3-21 to repeat the above-described process.

On the contrary, when it is checked in step S3-27 that the two pieces of error detection data EDC are not the same, the master device 10 discards the received touch data T_S (S3-29) and performs step S3-5 to initialize the slave device 100.

As described above, the master device 10 repeats the process of receiving the touch data T_S of the slave device 100 and determining whether or not the slave device 100 malfunctions. Needless to say, however, the master device 10 performs its unique operations, e.g., data transmission, reception and processing, and repeats the process of receiving the touch data T_S of the slave device 100 when the touch data T_S of the slave device 100 is needed and determining whether or not the slave device 100 malfunctions with the set cycle.

As described above with reference to FIG. 3, the slave device 100 has a volatile storage, e.g., a register, a latch or a static RAM, and data stored in the volatile storage may be changed due to external static electricity, electric power, and other noise. Thus, the master device 10 checks the error detection data EDC stored in the register 120 of the slave device 100 and can recognize whether or not the slave device 100 malfunctions according to whether or not the stored error detection data EDC is changed.

In other words, when the error detection data EDC stored in the register 120 of the slave device 100 is changed, the master device determines that the slave device 100 is affected by surroundings and thus data of the register 120 is changed, recognizes that the slave device 100 malfunctions, and restores the slave device to its normal operating state by initializing the slave device 100.

Figure 4:
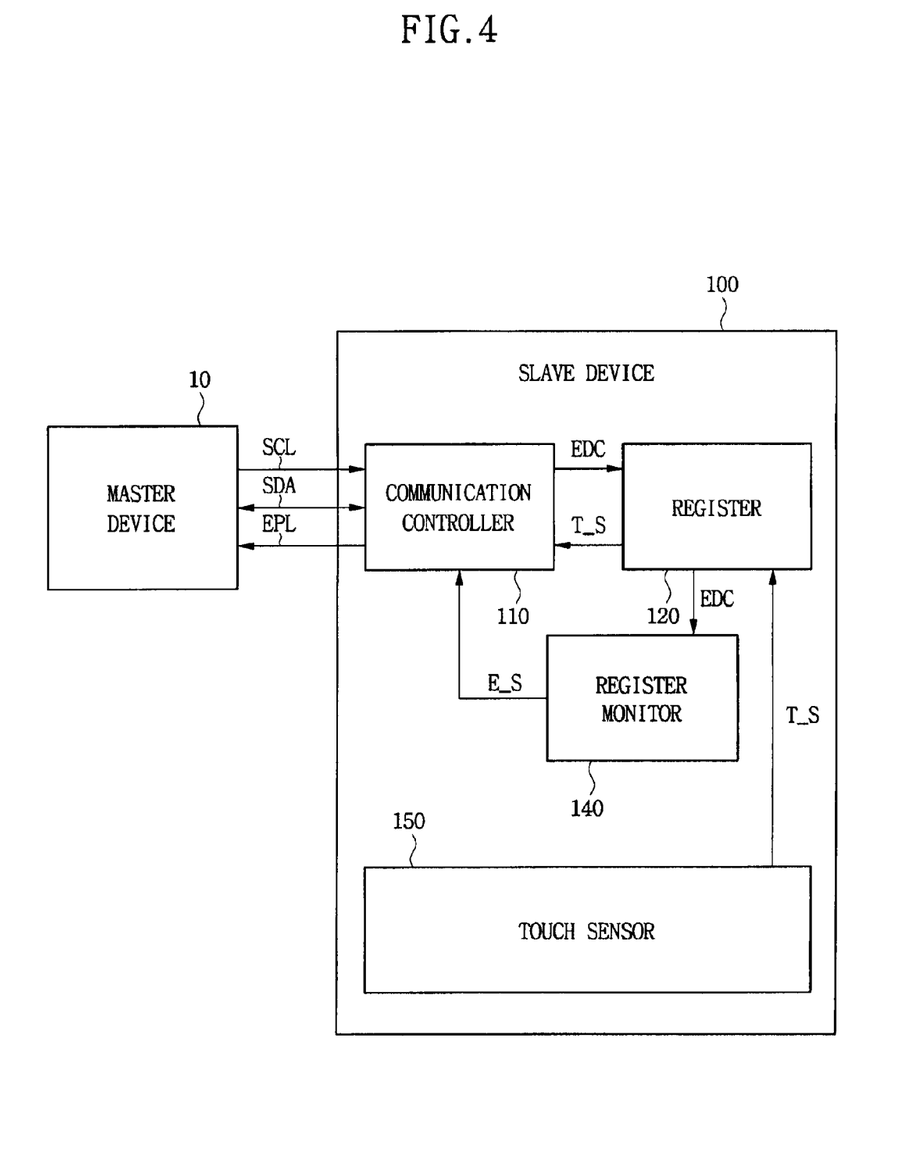
FIG. 4 is a block diagram of a communication system capable of automatic restoration according to a second exemplary embodiment of the present invention.

FIG. 4 is a block diagram of a communication system capable of automatic restoration according to a second exemplary embodiment of the present invention. The communication system includes a master device 10 and a slave device 100, and the slave device includes a communication controller 110, a register 120, a register monitor 140 and a touch sensor 150.

The components of the communication system capable of automatic restoration shown in FIG. 4 will be described below with reference to FIG. 2.

Components performing the same operation as described with reference to FIG. 2 are denoted by the same reference numerals as in FIG. 2, and their descriptions will be omitted.

The master device 10 and the slave device 100 are connected through a data line SDA, a clock line SCL and an error signal line EPL. The master device 10 outputs a reference clock through the clock line SCL to synchronize with a data transfer rate, and transmits and receives various pieces of data to and from the slave device 100 through the data line SDA in synchronization with the reference clock. In addition, the master device 10 checks for malfunction of the slave device 100 through the error signal line EPL and outputs a command and data for initializing the slave device 100 when the slave device 100 malfunctions.

Like the communication lines SCL and SDA, the error signal line EPL directly connects each slave device with an input/output (I/O) pin (not shown) of the master device 10. Thus, it is possible to immediately report a malfunction of the slave device 100 to the master device 10.

The communication controller 110 of the slave device 100 receives the reference clock from the master device 10, receives commands and data from the master device 10 in synchronization with the reference clock, and transmits data generated by the slave device 100. In particular, the communication controller 110 transmits touch data T_S stored in the register 120 to the master device 10, or receives an error signal E_S of the register monitor 140 and transmits it to the master device 10 through the error signal line EPL.

The register monitor 140 is included such that the slave device 100 can determine whether or not it malfunctions by itself. In the register monitor 140, a value previously determined by the master device 10 and the slave device 100, i.e., the error detection data EDC, is set not to vary. For example, a fuse voltage or a power supply voltage may be used. In addition, the register monitor 140 periodically compares the error detection data EDC of the register 120 and the set error detection data EDC, and outputs the error signal E_S to the communication controller 110 when the two pieces of error detection data EDC are not the same.

Here, the register monitor 140 sets the error detection data not to vary such that the slave device 100 can recognize its malfunction by comparing the error detection data EDC of a volatile storage, that is, the register 120 of the slave device 100, with the error detection data EDC set not to vary when the slave device 100 is affected by surroundings and data, i.e., the error detection data EDC, of the register 120 is lost or changed.

Figure 5:
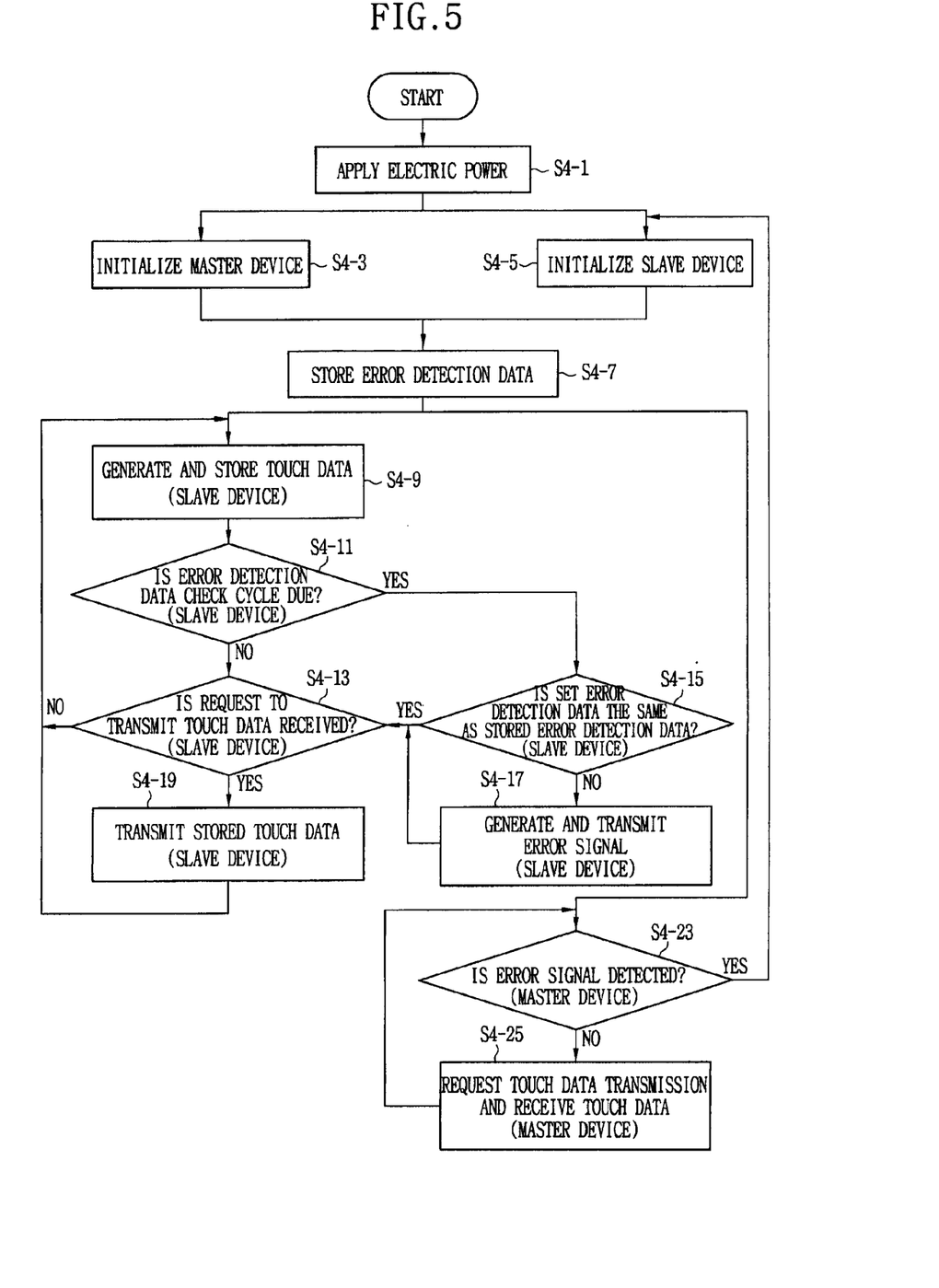
FIG. 5 is a flowchart showing a restoration operation of the communication system capable of automatic restoration shown in FIG. 4.

FIG. 5 is a flowchart showing a restoration operation of the communication system capable of automatic restoration shown in FIG. 4.

The restoration operation of the communication system capable of automatic restoration illustrated in FIG. 5 will be described below with reference to FIG. 4.

Electric power is applied to the master device 10 and the slave device 100 (S4-1).

When electric power is initially applied, the master device 10 performs an initialization step of initializing a register, etc. (S4-3), and simultaneously, the slave device 100 also performs the initialization step (S4-5). In particular, the register 120 of the slave device 100 is also initialized while the slave device 100 is initialized.

Subsequently, the master device 10 outputs the error detection data EDC, and the slave device 100 receiving the error detection data EDC stores it in the register 120 (S4-7).

The touch sensor 150 of the slave device 100 determines whether or not an external object touches the slave device 100 to generate the touch data T_S and outputs the generated touch data T_S to the register 120, and the register 120 stores the touch data T_S input from the touch sensor 150 (S4-9).

The register monitor 140 of the slave device 100 periodically checks whether a check cycle set to check the error detection data EDC of the register 120 is due (S4-11), and checks whether a request for the touch data T_S is received from the master device 10 when the set check cycle is not due (S4-13).

On the contrary, when it is checked in step S4-11 that the set check cycle is due, the register monitor 140 of the slave device 10 checks whether the error detection data EDC stored in the register 120 is the same as the set error detection data EDC by comparing the two pieces of error detection data EDC (S4-15).

When it is checked in step S4-15 that the two pieces of error detection data EDC are the same, step S4-13 is performed. On the contrary, when it is checked in step S4-15 that the two pieces of error detection data EDC are not the same, the error signal E_S is generated (S4-17).

At this time, the register monitor 140 outputs the generated error signal E_S to the communication controller 110, and the communication controller 110 receives the error signal E_S and outputs it to the master device 10 through the error signal line EPL.

Meanwhile, when it is checked in step S4-13 that the request for the touch data T_S is received from the master device 10, the touch data T_S stored in the register 120 is transmitted (S4-19), and then step S4-9 is performed.

On the contrary, when it is checked in step S4-13 that the request for the touch data T_S is not received from the master device 10, step S4-9 is performed.

Subsequently, the slave device 100 repeats steps S4-9 to S4-19 described above.

Meanwhile, the master device 10 checks whether the error signal E_S is detected through the error signal line EPL (S4-23). When the error signal E_S is not detected, the master device 10 requests the slave device 100 to transmit the touch data T_S, receives the touch data T_S of the slave device 100 (S4-25), and then repeats the error signal detection step S4-23.

On the contrary, when it is checked in step S4-23 that the error signal E_S is detected through the error signal line EPL, the master device 10 initializes the slave device 100 (S4-5).

As described above with reference to FIG. 5, the slave device 100 stores the error detection data EDC received from the master device 10 in the register 120, and the register monitor 140 periodically checks the error detection data EDC of the register 120 and reports whether or not the error detection data EDC is changed by transmitting the error signal E_S to the master device 10 through the separate line, i.e., the error signal line EPL, connected with the master device 10. Thus, the master device 10 recognizes whether or not the slave device 100 malfunctions, and can restore the slave device 100 by initializing the slave device 100.

In the second exemplary embodiment, the slave device 100 checks for malfunction by itself and reports whether or not it malfunctions to the master device 10, unlike the first exemplary embodiment. The slave device 100 can use a parity check method for detecting error of data stored in internal latches or flip-flops (not shown) of the register 120 (or static RAMs). The register monitor 140 of the slave device 100 can generate a test scan signal for the error detection. Thus, the load on the master device 10 can be reduced.

Figure 6:
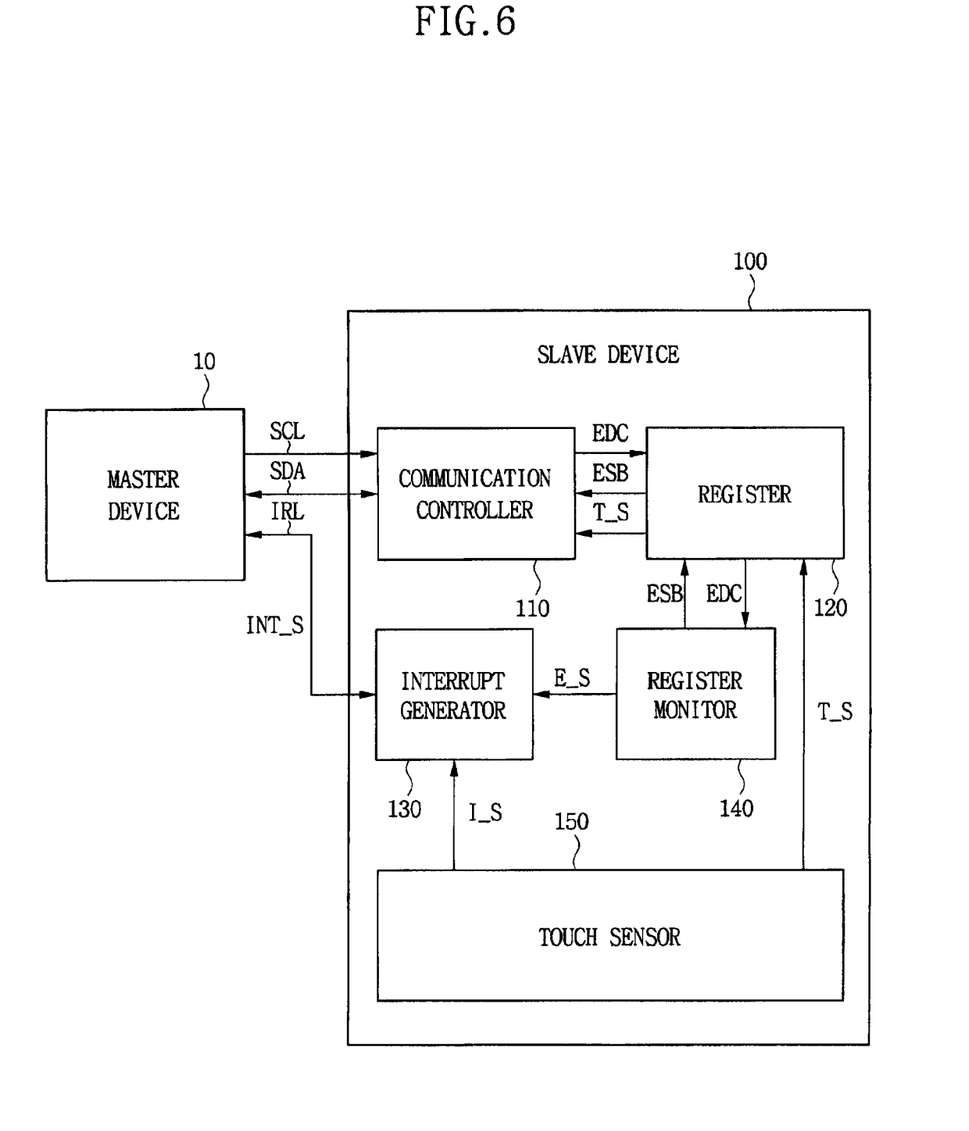
FIG. 6 is a block diagram of a communication system capable of automatic restoration according to a third exemplary embodiment of the present invention.

FIG. 6 is a block diagram of a communication system capable of automatic restoration according to a third exemplary embodiment of the present invention. The communication system includes a master device 10 and a slave device 100, and the slave device includes a communication controller 110, a register 120, an interrupt generator 130, a register monitor 140 and a touch sensor 150.

The components of the communication system capable of automatic restoration shown in FIG. 6 will be described below with reference to FIG. 4.

Components performing the same operation as described with reference to FIG. 4 are denoted by the same reference numerals as in FIG. 4, and their descriptions will be omitted.

The master device 10 and the slave device 100 are connected through a data line SDA, a clock line SCL and an interrupt signal line IRL. The master device 10 outputs a reference clock through the clock line SCL to synchronize with a data transfer rate, and transmits and receives various pieces of data to and from the slave device 100 through the data line SDA in synchronization with the reference clock.

In particular, the master device 10 requests the slave device 100 to transmit touch data T_S generated by the slave device 100 in response to an interrupt signal INT_S received through the interrupt signal line IRL, and receives the touch data T_S. Then, the master device 10 checks whether or not the slave device 100 malfunctions by examining the touch data T_S received from the slave device 100, and outputs a command and data for initializing the slave device 100 when the slave device 100 malfunctions.

The communication controller 110 of the slave device 100 receives the reference clock from the master device 10, receives commands and data from the master device 10 in synchronization with the reference clock, and transmits data generated by the slave device 100. In particular, the communication controller 110 transmits the touch data T_S stored in the register 120 to the master device 10, or includes an error state bit ESB of the register 120 in the touch data T_S and transmits the touch data T_S including the error state bit ESB to the master device 10.

The register 120 stores the touch data T_S output from the touch sensor 150, receives the error detection data EDC for monitoring the operating state of the slave device 100 from the master device 10, stores the received error detection data EDC, and receives and stores the error state bit ESB output from the register monitor 140. Here, the register 120 is initialized when the slave device 100 is initialized.

The register monitor 140 sets a value previously determined by the master device 10 and the slave device 100, i.e., the error detection data EDC, not to vary. For example, a fuse voltage or a power supply voltage may be used. In addition, the register monitor 140 periodically compares the error detection data EDC of the register 120 and the set error detection data EDC. When the two pieces of error detection data EDC are not the same, the register monitor 140 sets the error state bit ESB and outputs an error signal E_S to the interrupt generator 130.

The interrupt generator 130 is connected with the master device 10 through the interrupt signal line IRL, and generates and outputs the interrupt signal INT_S to the interrupt signal line IRL when a sensing interrupt signal I_S is generated by the touch sensor 150 or the error signal E_S is input from the register monitor 140.

When the touch data T_S is generated by the slave device 100 or the slave device 100 malfunctions, the interrupt signal line IRL connected to an external interrupt pin (not shown) of the master device 10 instantly reports this event to the master device 10 such that the master device 10 immediately receives the touch data T_S of the slave device 100 and restores the slave device 100 to its normal state. That is, the interrupt signal line IRL is intended to rapidly reflect operation of the slave device 100 to the master device 10.

In addition, the interrupt generator 130 may receive the interrupt signal INT_S from the master device 10. In this case, the interrupt signal INT_S may be a signal of the master device 10 requesting the slave device 100 to transmit the touch data T_S.

As described above, the interrupt generator 130 transmits and receives the interrupt signal INT_S to and from the master device 10 through the separate interrupt line IRL. However, the interrupt generator 130 may output the interrupt signal INT_S to the communication controller 110, and the communication controller 110 may transmit the interrupt signal INT_S to the master device 10. Also, the communication controller 110 may receive the interrupt signal INT_S from the master device 10.

For example, when the interrupt generator 130 outputs the interrupt signal INT_S to the communication controller 110 and the communication controller 110 transmits data corresponding to the interrupt signal INT_S through the data line SDA in synchronization with the clock signal, the master device 10 receives the data and performs an interrupt operation. Meanwhile, when the master device 10 transmits data corresponding to the interrupt signal INT_S through the data line SDA in synchronization with the clock signal, the communication controller 110 receives the data and performs the interrupt operation.

When an external object (not shown) touches the slave device 100, the touch sensor 150 generates the touch data T_S and compares the generated touch data T_S with the previously stored touch data T_S. When the two pieces of touch data T_S are not the same, the touch sensor 150 generates the sensing interrupt signal I_S, outputs it to the register 120, and stores it.

Figure 7:
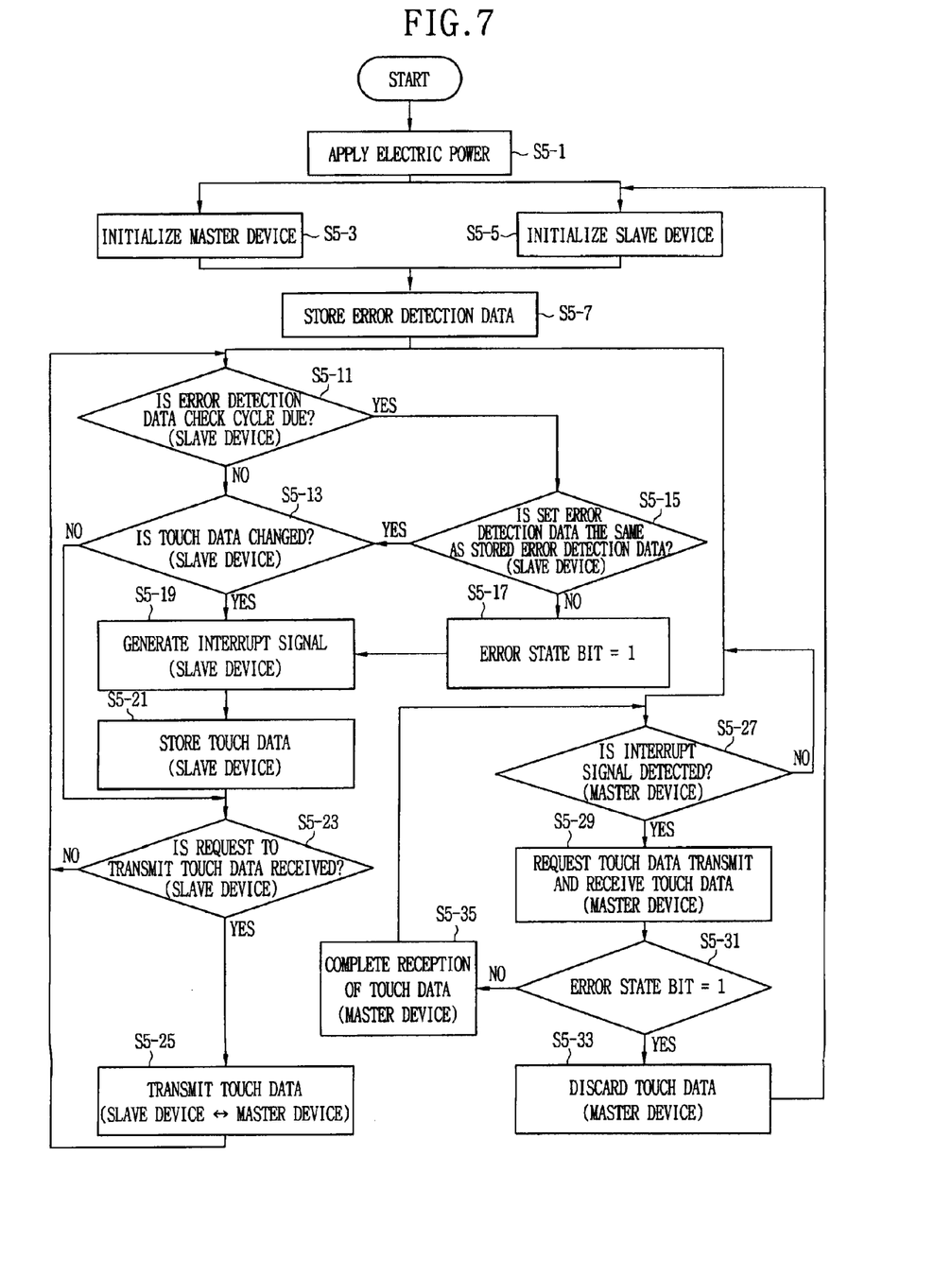
FIG. 7 is a flowchart showing a restoration operation of the communication system capable of automatic restoration shown in FIG. 6.

FIG. 7 is a flowchart showing a restoration operation of the communication system capable of automatic restoration shown in FIG. 6.

The restoration operation of the communication system capable of automatic restoration illustrated in FIG. 7 will be described below with reference to FIG. 6.

Electric power is applied to the master device 10 and the slave device 100 (S5-1).

When electric power is initially applied, the master device 10 performs an initialization step of initializing a register, etc. (S5-3), and simultaneously, the slave device 100 also performs the initialization step (S5-5). In particular, the register 120 of the slave device 100 is also initialized while the slave device 100 is initialized.

Subsequently, the master device 10 outputs the error detection data EDC to be stored in the register 120 of the slave device 100, and the slave device 100 receiving the error detection data EDC stores it in the register 120 (S5-7).

The register monitor 140 of the slave device 100 periodically checks whether a check cycle set to check the error detection data EDC of the register 120 is due (S5-11).

When it is checked in step S5-11 that the check cycle is due, the register monitor 140 of the slave device 100 checks whether the error detection data EDC stored in the register is the same as the set error detection data EDC by comparing them with each other (S5-15).

When it is checked in step S5-15 that the two pieces of error detection data EDC are not the same, the register monitor 140 sets the error state bit ESB of the register 120 and generates and outputs the error signal E_S to the interrupt generator 130 (S5-17).

Subsequently, when the error signal E_S is generated, the interrupt generator 130 generates the interrupt signal INT_S (S5-19).

Meanwhile, when it is checked in step S5-11 that the set check cycle is not due or it is checked in step S5-15 that the two pieces of error detection data EDC are the same, the touch sensor 150 of the slave device 100 determines whether or not an external object touches the slave device 100 to generate the touch data T_S, and checks whether the generated touch data T_S is changed from the previously stored touch data T_S by comparing the generated touch data T_S with the previously stored touch data T_S (S5-13).

When it is checked in step S5-13 that the generated touch data T_S is changed, the interrupt generator 130 generates the interrupt signal INT_S (S5-19).

In other words, when it is checked in step S5-13 that the touch data T_S is changed or the error signal E_S is generated in step S5-17, step S5-19 is performed to generate the interrupt signal INT_S.

After step S5-19, the touch sensor 150 stores the generated touch data T_S and outputs it to the register 120, and the register 120 stores it (S5-21).

Meanwhile, when it is checked in step S5-13 that the generated touch data T_S is not changed, or after the touch data T_S is stored in step S5-21, it is checked whether a request to transmit the touch data T_S is received from the master device 10 (S5-23).

When it is checked in step S5-23 that the request to transmit the touch data T_S is not received from the master device 10, step S5-11 is performed. On the other hand, when the request to transmit the touch data T_S is received from the master device 10, the communication controller 110 receives the touch data T_S and the error state bit ESB stored in the register 120, includes the error state bit ESB in the touch data T_S, and transmits the touch data T_S including the error state bit ESB (S5-25). Subsequently, step S5-11 is performed.

While repeating the process of generating and outputting the touch data T_S as described above, the slave device 100 receives and processes data transmitted from the master device 10.

Meanwhile, the master device 10 waits until the interrupt signal INT_S generated by the slave device 100 is detected through the interrupt line IRL (S5-27).

Needless to say, the master device 10 can perform another operation, e.g., transmission and reception with another slave device, until the interrupt signal INT_S is detected.

When it is checked in step S5-27 that the interrupt signal INT_S is detected, the master device 10 requests the slave device 100 to transmit the touch data T_S and receives the touch data T_S including the error state bit ESB from the slave device 100 (S5-29).

Subsequently, the master device 10 examines the error state bit ESB included in the touch data T_S (S5-31). When the error state bit ESB is set, i.e., "1", the master device 10 discards the received touch data T_S (S5-33) and performs step S5-5 to initialize the slave device 100.

On the other hand, when the error state bit ESB is not set, the master device 10 completes reception of the touch data T_S (S5-35) and performs step S5-27 to wait for the next interrupt signal INT_S.

As described with reference to FIG. 7, the slave device 100 sets the error detection data EDC previously determined by the master device 10 and the slave device 100, and recognizes its malfunction through the process of checking whether or not the error detection data EDC is changed. When the slave device 100 recognizes its malfunction, it includes the bit ESB for reporting its malfunction in the touch data T_S to be transmitted to the master device 10 and generates the interrupt signal INT_S.

Only when the interrupt signal INT_S is generated by the slave device 100, the master device 10 requests the slave device 100 to transmit the touch data T_S, receives the touch data T_S, and recognizes whether or not the slave device 100 malfunctions by examining the error state bit ESB of the received touch data T_S. When the slave device 100 malfunctions, the master device 10 initializes the slave device 100 to restore it to its normal operating state.

In the third exemplary embodiment, the slave device 100 checks whether or not it malfunctions by itself and immediately reports its malfunction state or the touch data T_S generated from it to the master device 10, unlike the second exemplary embodiment. Thus, the load on the master device 10 can be reduced, and also it is possible to immediately recognize malfunction of the slave device 100 and restore the slave device 100.

In the communication systems capable of automatic restoration and methods of restoring the communication systems according to the first to third exemplary embodiments of the present invention, the master device 10 transmits the error detection data EDC to the slave device 100 during initialization. However, during initialization, the slave device 100 may store the error detection data EDC generated using a previously set algorithm by itself in the register 120 and transmit the stored error detection data EDC to the master device 10 such that the error detection data EDC can be used as the error detection data EDC of the master device 10.

Here, if the master device 10 has the error detection data EDC when the slave device 100 generates the error detection data EDC, the slave device 100 may generate the same error detection data EDC as that of the master device 10 according to a previous agreement between the master device 10 and the slave device 100, store it in the register 120, but not transmit it to the master device 10.

To this end, in steps S3-7, S4-7 and S5-7 of the first to third exemplary embodiments shown in FIGS. 3, 5 and 7, the slave device 100 may generate, store and transmit the error detection data EDC to the master device 10, and the master device 10 may store the received error detection data EDC. This is different from the descriptions above in which the master device 10 transmits the error detection data EDC and the slave device 100 receives and stores it.

For example, during initialization in the first exemplary embodiment, the slave device 100 has a data generator (not shown) for error detection, generates the same error detection data EDC as that of the master device 10 using a previously set algorithm, stores it in the register 120, and transmits it to the master device 10.

During initialization in the second and third exemplary embodiments, the register monitor 140 monitoring data of the register 120 generates the error detection data EDC using a previously set algorithm. Here, the register monitor 140 may generate the same error detection data EDC as that set in the register monitor 140 and store it in the register 120.

Figure 8:
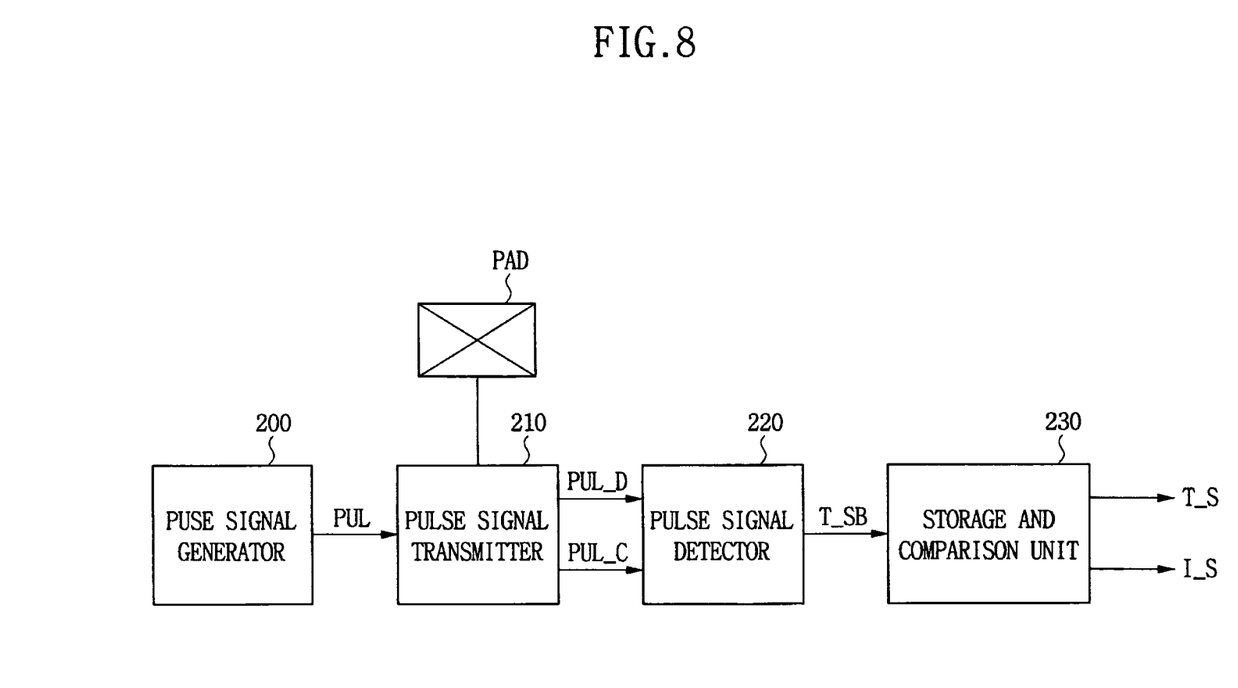
FIG. 8 is a block diagram of a touch sensor according to an exemplary embodiment of the present invention.

FIG. 8 is a block diagram of a touch sensor according to an exemplary embodiment of the present invention. The touch sensor includes a pulse signal generator 200, a pulse signal transmitter 210, a pulse signal detector 220, a storage and comparison unit 230, and a touch pad PAD.

The components and operation of the touch sensor shown in FIG. 8 will be described below with reference to FIG. 6.

The pulse signal generator 200 generates a pulse signal PUL having a set pulse width.

The pulse signal transmitter 210 receives the pulse signal PUL of the pulse signal generator 200, and has the touch pad PAD that an object having a specific capacitance touches.

The pulse signal transmitter 210 delays an output pulse signal PUL_D according to the capacitance of an object touching the touch pad PAD. The pulse signal transmitter 210 outputs a pulse signal PUL_C obtained by uniformly delaying the pulse signal PUL regardless of touch of the touch pad PAD as well as the pulse signal PUL_D obtained by delaying the pulse signal PUL according to the object touching the touch pad PAD.

The pulse signal detector 220 receives the two pulse signals PUL_D and PUL_C output from the pulse signal transmitter 210, compares the two signals, determines whether or not an object touches the touch pad PAD according to the delay of the pulse signal PUL_D, and outputs the determined result as comparison touch data T_SB.

The storage and comparison unit 230 receives the comparison touch data T_SB and compares it with previously stored touch data T_S. When the comparison touch data T_SB is not the same as the previously stored touch data T_S, the storage and comparison unit 230 stores the comparison touch data T_SB as the touch data T_S and outputs it to the register 120. When the new touch data T_S is generated, the storage and comparison unit 230 outputs a sensing interrupt signal I_S and thereby reports that the new touch data T_S is generated to the master device 10. The storage and comparison unit 230 may include a filter, e.g., a low-pass filter, capable of filtering the comparison touch data T_SB.

At least one each of the pulse signal generator 200, the pulse signal transmitter 210, the pulse signal detector 220, the storage and comparison unit 230, and the touch pad PAD may be included such that at least one piece of touch data T_S and at least one sensing interrupt signal I_S can be generated. Needless to say, the touch pad PAD may be disposed outside of the touch sensor 150.

For convenience, only one slave device 100 is connected with the master device 10 in the above description, but a plurality of slave devices 100 can be connected with the master device 10.

While the invention has been shown and described with reference to certain exemplary embodiments thereof, it will be understood by those skilled in the art that various changes in form and details may be made therein without departing from the spirit and scope of the invention as defined by the appended claims.

In a master-slave communication system capable of automatic restoration from a malfunction and a method of restoring the communication system according to exemplary embodiments of the present invention, a master device recognizes malfunction of a slave device having a volatile storage due to its surroundings, initializes the slave device, and thus can restore the slave device to its normal operating state. When the slave device is a human input device that is easily disturbed by static electricity of a human body, the error detection scheme prevents an erroneous operation.

What is claimed is:

1. A communication system, comprising:
   a master device for storing first error detection data, transmitting a reference clock to a slave device through a clock line, transmitting and receiving data with the slave device through a data line, receiving input data from the slave device, requesting error detection data to the slave device and receiving second error detection data from the slave device; and
   the slave device for storing the second error detection data, receiving the reference clock, detecting human input data, transmitting and receiving the data with the master device, generating and transmitting the input data to the master device, and transmitting the second error detection data to the master device in response to the request for error detection data,
   wherein the master device compares the first error detection data with the second error detection data and initializes the slave device when the stored first error detection data is not the same as the second error detection data,
   wherein the second error detection data is stored the same as the first error detection data during initialization, and
   wherein the stored second error detection data is changeable.

2. The communication system of claim 1, wherein the human input data is generated by a touch of a human body and a change of the second error detection data is caused by a static electricity of the human body.

3. The communication system of claim 1, wherein during initialization, the master device transmits the first error detection data and the slave device receives the first error detection data and stores the first error detection data as the second error detection data, and after initialization, the master device receives the second error detection data, compares the second error detection data with the first error detection data or error detection data received from the slave device during initialization, and initializes the slave device when the second error detection data is not the same as the first error detection data or the error detection data received from the slave device during initialization.

4. The communication system of claim 3, wherein the slave device comprises:
- an input unit for receiving an external signal applied from outside and generating and outputting the input data;
- a register for storing the second error detection data and the output input data; and
- a communication controller for transmitting and receiving the data, transmitting the input data, and transmitting the second error detection data stored in the register in response to the request of the master device.

5. The communication system of claim 3, wherein the input unit is a touch sensor recognizing whether or not an external object such as a human body touches the slave device or a proximity sensor recognizing whether or not the external object is in a proximity of the slave device, and the external signal is generated by a touch or a proximity of the external object.

6. The communication system of claim 5, wherein the input unit is a touch sensor recognizing whether or not an external object touches the slave device, outputting touch data as the input data, the input unit including:
- a pulse signal generator for generating a reference pulse signal;
- a touch pad that the external object touches;
- a pulse signal transmitter for receiving the reference pulse signal and outputting a delay pulse signal obtained by delaying the reference pulse signal according to a capacitance of the external object touching the touch pad and a fixed pulse signal obtained by uniformly delaying the reference pulse signal regardless of the touch pad; and
- a pulse signal detector for receiving the delay pulse signal and the fixed pulse signal output from the pulse signal transmitter, comparing the delay pulse signal with the fixed pulse signal, determining whether or not the external object touches the slave device according to a delay of the delay pulse signal, and outputting the touch data.

7. The communication system of claim 4, wherein the slave device further comprises a data generator for generating the error detection data using a previously set algorithm, and during initialization, generates the error detection data, stores the error detection data in the register, and transmits the error detection data through the communication controller.

8. A communication system, comprising:
- a master device for transmitting a reference clock to a slave device through a clock line, transmitting and receiving data with the slave device through a data line, and receiving input data from the slave device through the data line; and
- the slave device for storing error detection data, receiving the reference clock, detecting human input data, transmitting and receiving the data with the master device, and generating and transmitting the input data and a detection signal for reporting an operating state error to the master device, the slave device having set error verification data, wherein when the slave device detects an error using the set error verification data, the slave device generates and transmits the detection signal to the master device, and the master device initializes the slave device in response to the detection signal, wherein the error detection data is stored the same as the set error verification data during initialization, and wherein the stored error detection data is changeable.

9. The communication system of claim 8, wherein the human input data is generated by a touch of a human body and a change of the error detection data caused by a static electricity of the human body.

10. The communication system of claim 9, wherein during initialization, the master device transmits the error detection data set the same as the set error verification data, and the slave device receives and stores the error detection data, and after initialization, the slave device compares the set error verification data with the error detection data stored in the slave device, and generates and transmits the detection signal to the master device when the set error verification data is not the same as the stored error detection data, and the master device initializes the slave device in response to the detection signal.

11. The communication system of claim 10, further comprising:
- an error signal line for the slave device to rapidly transmit the detection signal indicating a malfunction state to the master device.

12. The communication system of claim 11, wherein the slave device comprises:
- an input unit for receiving an external signal applied from outside, and generating and outputting the input data;
- a register for storing the received error detection data and the output input data;
- a register monitor having the set error verification data, comparing the set error verification data with the stored error detection data, and generating and outputting the detection signal when the set error verification data is not the same as the stored error detection data; and
- a communication controller for transmitting and receiving the data, transmitting the input data, and receiving and transmitting the detection signal.

13. The communication system of claim 12, wherein the slave device further comprises a data generator for generating the same error detection data as the set error verification data using a previously set algorithm, and generates and stores the error detection data in the register during initialization.

14. The communication system of claim 12, wherein the register monitor has the set error verification data, generates the same error detection data as the set error verification data using a previously set algorithm, and stores the error detection data in the register.

15. The communication system of claim 12, wherein the input unit is a touch sensor recognizing whether or not an external object such as a human body touches the slave device or a proximity sensor recognizing whether or not the external object is in a proximity of the slave device, and the external signal is generated by a touch or a proximity of the human body.

16. The communication system of claim 15, wherein the input unit is a touch sensor recognizing whether or not an external object touches the slave device, outputting touch data as the input data, the input unit including:

a pulse signal generator for generating a reference pulse signal;

a touch pad that the external object touches;

a pulse signal transmitter for receiving the reference pulse signal and outputting a delay pulse signal obtained by delaying the reference pulse signal according to a capacitance of the external object touching the touch pad and a fixed pulse signal obtained by uniformly delaying the reference pulse signal regardless of the touch pad; and a pulse signal detector for receiving the delay pulse signal and the fixed pulse signal output from the pulse signal transmitter, comparing the delay pulse signal with the fixed pulse signal, determining whether or not the external object touches the slave device according to a delay of the delay pulse signal, and outputting the touch data.

17. The communication system of claim 10, wherein after initialization, the slave device sets and stores an error state bit indicating an error state when the slave device compares the set error verification data with the stored error detection data and determines that the set error verification data is not the same as the stored error detection data, and the master device requests and receives the input data including the error state bit when the master device detects the detection signal, and initializes the slave device when the error state bit is set in the received input data.

18. The communication system of claim 17, further comprising:
an interrupt signal line connected to an interrupt pin additionally included in the master device such that the slave device transmits the detection signal to the master device.

19. The communication system of claim 18, wherein the slave device comprises:
an input unit for receiving an external signal applied from outside, generating and outputting the input data, and outputting a sensing signal when the input data is generated;

a register monitor having the set error verification data, comparing the set error verification data with the stored error detection data, and when the set error verification data is not the same as the stored error detection data, generating and outputting an error signal and setting and outputting the error state bit;

a register for storing the received error detection data, and receiving and storing the output input data and the error state bit;

a detection signal generator for outputting the detection signal when the error signal or the sensing signal is applied; and a communication controller for transmitting and receiving the data, including the error state bit in the input data, and transmitting the input data.

20. The communication system of claim 19, wherein the slave device further comprises a data generator for generating the same error detection data as the set error verification data using a previously set algorithm, and generates and stores the error detection data in the register during initialization.

21. The communication system of claim 19, wherein the register monitor has the set error verification data, generates the same error detection data as the set error verification data using a previously set algorithm, stores the error detection data in the register, compares the set error verification data with the stored error detection data, and generates the error signal and sets and outputs the error state bit when the set error verification data is not the same as the stored error detection data.

22. The communication system of claim 19, wherein the input unit is a touch sensor recognizing whether or not an external object touches the slave device, outputting touch data as the input data, the input unit including:
a pulse signal generator for generating a reference pulse signal;

a touch pad that the external object touches;

a pulse signal transmitter for receiving the reference pulse signal and outputting a delay pulse signal obtained by delaying the reference pulse signal according to a capacitance of the external object touching the touch pad and a fixed pulse signal obtained by uniformly delaying the reference pulse signal regardless of the touch pad;

a pulse signal detector for receiving the delay pulse signal and the fixed pulse signal output from the pulse signal transmitter, comparing the delay pulse signal with the fixed pulse signal, determining whether or not the external object touches the slave device according to a delay of the delay pulse signal, and generating the touch data; and a storage and comparison unit for comparing the generated touch data with previously stored touch data, and when the generated touch data is not the same as the previously stored touch data, storing the generated touch data and outputting the sensing signal.

23. A method of restoring a communication system including a master device for storing first error detection data, transmitting a reference clock and data to a slave device and requesting error detection data to the slave device and receiving second error detection data from the slave device, and the slave device for storing the second error detection data, detecting human input data and generating and transmitting the input data to the master device, the method comprising:
a data setting step of initializing the master device and the slave device, and storing, at the slave device, the second error detection data being the same as the first error detection data for detecting a malfunction, wherein the stored second error detection data is changeable;

an error detection step of requesting and receiving, at the master device, the second error detection data and determining whether or not the error detection data is changed by comparing the first error detection data with the second error detection data; and an initialization step of initializing, at the master device, the slave device according to whether or not the error detection data is changed.

24. The method of claim 23, wherein the data setting step comprises:
a master initialization step of initializing data in the master device;

a slave initialization step of initializing data in the slave device; and a detection data storage step of transmitting, at the master device, the first error detection data to the slave device, and receiving and storing, at the slave device, the first error detection data as the second error detection data.

25. The method of claim 23, wherein the data setting step comprises:
a master initialization step of initializing data in the master device;

a slave initialization step of initializing data in the slave device; and a detection data storage step of generating and transmitting the first error detection data to the master device, storing the first error detection data as the second error detection data, at the slave device, and receiving and storing, at the master device, the first error detection data.

26. The method of claim 23, wherein the error detection step comprises:
- a check cycle checking step of checking, at the master device, whether a check cycle set for the second error detection data of the slave device is due;
- a detection data request step of performing, at the master device, the check cycle checking step when the check cycle for the second error detection data is not due, and requesting, at the master device, the slave device to transmit the error detection data when the check cycle for the second error detection data is due; and
- a reception step of receiving the second error detection data.

27. The method of claim 26, wherein the initialization step comprises:
- a detection data comparison step of checking, at the master device, whether the second error detection data is changed by comparing the first error detection data with the second error detection data; and
- a detection finishing step of performing the check cycle checking step when it is checked in the detection data comparison step that the two pieces of error detection data are the same, and initializing the slave device when the two pieces of error detection data are not the same.

28. A method of restoring a communication system including a master device for transmitting a reference clock and data to a slave device and receiving input data from the slave device, and a slave device for storing error detection data, detecting human input data, receiving the data from the master device, generating and transmitting the input data to the master device, and having set error verification data, the method comprising:
- a data setting step of initializing the master device and the slave device and storing the error detection data being the same as the set error verification data for detecting a malfunction of the slave device, wherein the stored error detection data is changeable;
- an error detection step of comparing, at the slave device, the set error verification data with the stored error detection data and outputting a detection signal according to whether or not the set error verification data is the same as the error detection data; and
- an initialization step of initializing, at the master device, the slave device in response to the detection signal.

29. The method of claim 28, wherein the data setting step comprises:
- a master initialization step of initializing data in the master device;
- a slave initialization step of initializing data in the slave device; and
- a detection data storage step of transmitting, at the master device, the error detection data set the same as the set error verification data, and receiving and storing, at the slave device, the error detection data.

30. The method of claim 28, wherein the data setting step comprises:
- a master initialization step of initializing data in the master device;
- a slave initialization step of initializing data in the slave device; and
- a detection data storage step of generating, storing and transmitting, at the slave device, the same error detection data as the set error verification data, and receiving and storing, at the master device, the error detection data.

31. The method of claim 28, wherein the error detection step comprises:
- a check cycle checking step of checking, at the slave device, whether a check cycle set for the stored error detection data is due;
- a change checking step of comparing the stored error detection data with the set error verification data when the set check cycle is due, performing the check cycle checking step when the stored error detection data is the same as the set error verification data, and performing the next step when the stored error detection data is not the same as the set error verification data; and
- a detection signal output step of outputting the detection data.

32. The method of claim 31, wherein the initialization step comprises initializing the slave device when the master device detects the detection signal of the slave device.

33. The method of claim 28, wherein the error detection step comprises:
- a check cycle checking step of checking, at the slave device, whether a check cycle set for the stored error detection data is due;
- a change checking step of checking whether the stored error detection data is the same as the set error verification data by comparing the stored error detection data with the set error verification data when the set check cycle is due; and
- a detection signal output step of setting an error state bit indicating an error state and outputting the detection signal when stored error detection data is not the same as the set error verification data, and performing the check cycle checking step when the stored error detection data is the same as the set error verification data.

34. The method of claim 33, wherein the initialization step comprises:
- a touch data request and output step of requesting, at the master device, the slave device to transmit the input data in response to the detection signal, and including, at the slave device, the error state bit in the input data and outputting the input data in response to the input data request of the master device;
- a touch data checking step of receiving, at the master device, the input data and examining the error state bit; and
- an error state bit checking step of initializing the slave device when it is examined in the touch data checking step that the error state bit is set in the input data.

* * * * *